UNITED STATES PATENT OFFICE.

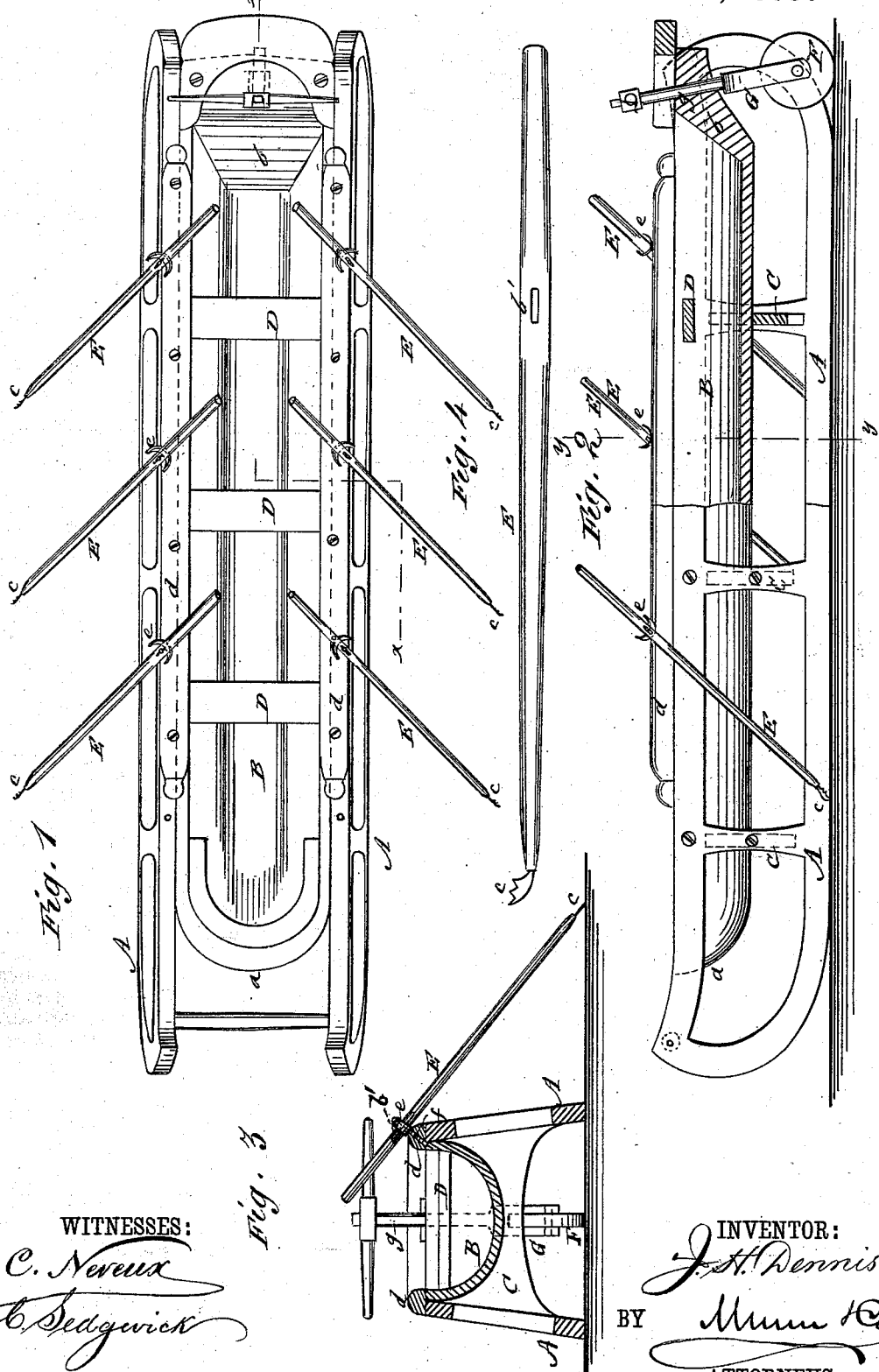

JAMES H. DENNIS, OF NEWARK, NEW JERSEY.

IMPROVEMENT IN SLEDS.

Specification forming part of Letters Patent No. 222,024, dated November 25, 1879; application filed September 30, 1879.

*To all whom it may concern:*

Be it known that I, JAMES H. DENNIS, of Newark, in the county of Essex and State of New Jersey, have invented a new and Improved Sled, of which the following is a specification.

The invention consists in combining a sled-frame, sweeps arranged in rowlocks, and a hand steering device, as hereinafter described.

In the accompanying drawings, Figure 1 is a plan of my improved sled. Fig. 2 is a sectional side elevation of the same, the section being taken on line $x\,x$ of Fig. 1. Fig. 3 is a cross-section of the sled, taken on line $y\,y$ of Fig. 2; and Fig. 4 is a detail of one of the sweeps.

Similar letters of reference indicate corresponding parts.

Referring to the drawings, A A are the runners of the sled. B is the body thereof, semi-elliptical in cross-section, like a boat, and having its forward end, $a$, rounded, and its rear end, $b$, square. Said body is placed between the runners A A on the beams C, connecting said runners, and is fastened in place in any suitable manner. The body is made water-tight, so that in case the ice breaks while the sled is upon it the said body will float and sustain the weight of the sled and the occupants thereof.

D represents the seats, placed transversely of the body B. E represents the sweeps, provided with slots $b'$, and having at their outer ends claws or serrated shoes $c$, made of metal and secured to the sweeps in any suitable manner, so as to enable them to take hold of the snow and ice readily when the sweeps are operated.

On the side rails, $d\,d$, of the sled are pivoted oar-locks $e$ for the sweeps E. The sweeps are secured in the said oar-locks by passing the pivots $f$ through slots $b'$, the oar-locks $e$, and thence into the side rails, $d$. The sweeps are in this manner securely connected with the sled, but at the same time they are allowed a perfectly free movement on their pivots in the direction of the length of the sled like the oars of a boat, so that the occupants of the sled, sitting on the seats D and working the sweeps so as to make the shoes $c$ take hold of the ice and snow, can propel the sled as easily as a boat is propelled in the water with oars; and in case the ice breaks and the sled is let into the water the sweeps can be used as oars to propel the sled through the water.

To steer the sled, I make use of a wheel, F, pivoted between the sides of a yoke, G. The said yoke has a post, $g$, which is passed up through the rear end, $b$, of the sled, and is pivoted in said end $b$ so as to be turned freely on its axis, whereby wheel F can be adjusted to any desired angle with relation to the length of the sled for the purpose of steering. When turned at right angles to the sled it serves as a brake to stop it or slow its movement.

The wheel is intended to have a steel or rubber tire, to enable it to take hold of the ice and snow.

I am aware that the sled-frame, oars, row-locks, and steering device are not severally new; but

What I claim as new and of my invention is—

The combination of the sled-frame A, the sweeps E, arranged in rowlocks on rails $d$, and the hand-wheel device F G at the rear, as and for the purpose specified.

JAMES H. DENNIS.

Witnesses:
CATHARINE E. HAGAMAN,
WM. H. HAGAMAN, Jr.